United States Patent
Harik

(10) Patent No.: US 8,438,154 B2
(45) Date of Patent: May 7, 2013

(54) GENERATING INFORMATION FOR ONLINE ADVERTISEMENTS FROM INTERNET DATA AND TRADITIONAL MEDIA DATA

(75) Inventor: Georges R. Harik, Mountain View, CA (US)

(73) Assignee: Google Inc., Mountain View, CA (US)

(*) Notice: Subject to any disclaimer, the term of this patent is extended or adjusted under 35 U.S.C. 154(b) by 1955 days.

(21) Appl. No.: 10/674,056

(22) Filed: Sep. 29, 2003

(65) Prior Publication Data

US 2005/0065806 A1 Mar. 24, 2005

Related U.S. Application Data

(60) Provisional application No. 60/483,620, filed on Jun. 30, 2003.

(51) Int. Cl.
*G06F 7/00* (2006.01)
*G07B 15/02* (2006.01)

(52) U.S. Cl.
USPC .................................. 707/723; 705/14.53

(58) Field of Classification Search .................. 707/723; 705/14
See application file for complete search history.

(56) References Cited

U.S. PATENT DOCUMENTS

| | | | |
|---|---|---|---|
| 6,269,361 B1 * | 7/2001 | Davis et al. | 707/2 |
| 6,484,148 B1 | 11/2002 | Boyd | |
| 6,804,664 B1 | 10/2004 | Hartman et al. | |
| 6,876,997 B1 * | 4/2005 | Rorex et al. | 707/3 |

FOREIGN PATENT DOCUMENTS

| WO | WO 01/90947 | 11/2001 |
|---|---|---|

OTHER PUBLICATIONS

Chinese Office Action for Chinese Patent Application No. 200480033436.5, mailed on Nov. 23, 2007 (6 pgs.) (with English Translation (11 pgs.)).
Notice of Reasons of Rejection for Japanese Patent Application No. 2006-533990, mailed Dec. 9, 2008 (5 pgs.) with translation (6 pgs.).
Examiner's First Report on Australian Patent Application No. 2004279061, mailed on Apr. 23, 2008 (2 pgs.).
Canadian Office Action for Canadian Patent Application No. 2,540,684, mailed Sep. 29, 2009 (4 pgs.).
Notification of the Third Office Action for Chinese Patent Application No. 200480033436.5, mailed Jan. 24, 2011 (4 pgs.) with translation (6 pgs.).
Notification of Reexamination for Chinese Patent Application No. 200480033436.5, mailed Apr. 26, 2012 (3 pgs.) with translation (4 pgs.).
Examiner's Report No. 2 on Australian Patent Application No. 2004279061, mailed on Apr. 29, 2009 (2 pgs.).
Rejection Decision for Chinese Patent Application No. 200480033436.5, mailed May 3, 2011 (5 pgs.) with translation (6 pgs.).
Notification of the Second Office Action for Chinese Patent Application No. 200480033436.5, mailed Jun. 19, 2009 (4 pgs.) with translation (5 pgs.).
Office Action for European Patent Application No. 04 785 081.3-1238, mailed Nov. 11, 2010 (7 pgs.).

* cited by examiner

*Primary Examiner* — Cam-Linh Nguyen
*Assistant Examiner* — Chelcie Daye
(74) *Attorney, Agent, or Firm* — John C. Pokotylo; Straub & Pokotylo

(57) ABSTRACT

Online information (such as advertiser Web pages in conjunction with products lists, Web content, existing online ads, etc.), or an electronic version of offline advertisement information, is used to generate online advertising information, such as a landing page, targeting information, and/or ad creative information.

30 Claims, 9 Drawing Sheets

GENERATING INFORMATION FOR ONLINE ADVERTISEMENTS FROM INTERNET DATA AND TRADITIONAL MEDIA DATA

§0. RELATED APPLICATIONS AND PRIORITY CLAIMS

This application claims the benefit of U.S. Provisional Application Ser. No. 60/483,620, titled "METHOD FOR GENERATING ONLINE ADVERTISEMENTS FROM ONLINE DATA AND FROM TRADITIONAL MEDIA," filed on Jun. 30, 2003 and listing Georges R. Harik as the inventor. That provisional application is incorporated herein by reference. The present invention is not limited by any particular embodiments or limitations of that provisional application.

§1. BACKGROUND OF THE INVENTION

§1.1 Field of the Invention

The present invention concerns advertising. In particular, the present invention concerns generating information for the targeted serving of ads.

§1.2 Related Art

Advertising using traditional media, such as television, radio, newspapers and magazines, is well known. Unfortunately, even when armed with demographic studies and entirely reasonable assumptions about the typical audience of various media outlets, advertisers recognize that much of their ad budget is simply wasted. Moreover, it is very difficult to identify and eliminate such waste.

Recently, advertising over more interactive media has become popular. For example, as the number of people using the Internet has exploded, advertisers have come to appreciate media and services offered over the Internet as a potentially powerful way to advertise.

Advertisers have developed several strategies in an attempt to maximize the value of such advertising. In one strategy, advertisers use popular presences or means for providing interactive media or services (referred to as "Web sites" in the specification without loss of generality) as conduits to reach a large audience. Using this first approach, an advertiser may place ads on the home page of the New York Times Web site, or the USA Today Web site, for example. In another strategy, an advertiser may attempt to target its ads to narrower niche audiences, thereby increasing the likelihood of a positive response by the audience. For example, an agency promoting tourism in the Costa Rican rainforest might place ads on the ecotourism-travel subdirectory of the Yahoo Web site. An advertiser will normally determine such targeting manually.

Regardless of the strategy, Web site-based ads (also referred to as "Web ads") are typically presented to their advertising audience in the form of "banner ads"—i.e., a rectangular box that includes graphic components. When a member of the advertising audience (referred to as a "viewer" or "user" in the Specification without loss of generality) selects one of these banner ads by clicking on it, embedded hypertext links typically direct the viewer to the advertiser's Web site. This process, wherein the viewer selects an ad, is commonly referred to as a "click-through" ("Click-through" is intended to cover any user selection.). The ratio of the number of click-throughs to the number of impressions of the ad (i.e., the number of times an ad is displayed) is commonly referred to as the "click-through rate" of the ad.

A "conversion" is said to occur when a user consummates a transaction related to a previously served ad. What constitutes a conversion may vary from case to case and can be determined in a variety of ways. For example, it may be the case that a conversion occurs when a user clicks on an ad, is referred to the advertiser's web page, and consummates a purchase there before leaving that web page. Alternatively, a conversion may be defined as a user being shown an ad, and making a purchase on the advertiser's web page within a predetermined time (e.g., seven days). In yet another alternative, a conversion may be defined by an advertiser to be any measurable/observable user action such as, for example, downloading a white paper, navigating to at least a given depth of a Website, viewing at least a certain number of Web pages, spending at least a predetermined amount of time on a Website or Web page, etc. Often, if user actions don't indicate a consummated purchase, they may indicate a sales lead, although user actions constituting a conversion are not limited to this. Indeed, many other definitions of what constitutes a conversion are possible. The ratio of the number of conversions to the number of impressions of the ad (i.e., the number of times an ad is displayed) is commonly referred to as the conversion rate. If a conversion is defined to be able to occur within a predetermined time since the serving of an ad, one possible definition of the conversion rate might only consider ads that have been served more than the predetermined time in the past.

Despite the initial promise of Web site-based advertisement, there remain several problems with existing approaches. Although advertisers are able to reach a large audience, they are frequently dissatisfied with the return on their advertisement investment.

Similarly, the hosts of Web sites on which the ads are presented (referred to as "Web site hosts" or "ad consumers") have the challenge of maximizing ad revenue without impairing their users' experience. Some Web site hosts have chosen to place advertising revenues over the interests of users. One such Web site is "Overture.com", which hosts a so-called "search engine" service returning advertisements masquerading as "search results" in response to user queries. The Overture.com web site permits advertisers to pay to position an ad for their Web site (or a target Web site) higher up on the list of purported search results. If such schemes where the advertiser only pays if a user clicks on the ad (i.e., cost-per-click) are implemented, the advertiser lacks incentive to target their ads effectively, since a poorly targeted ad will not be clicked and therefore will not require payment. Consequently, high cost-per-click ads show up near or at the top, but do not necessarily translate into real revenue for the ad publisher because viewers don't click on them. Furthermore, ads that viewers would click on are further down the list, or not on the list at all, and so relevancy of ads is compromised.

Search engines, such as Google for example, have enabled advertisers to target their ads so that they will be rendered with a search results page and so that they will be relevant, presumably, to the query that prompted the search results page. Other targeted advertising systems may target ads based on e-mail information (See, e.g., the systems described in U.S. patent application Ser. No. 10/452,830 (incorporated herein by reference), entitled "SERVING ADVERTISEMENTS USING INFORMATION ASSOCIATED WITH E-MAIL", filed on Jun. 2, 2003 and listing Jeffrey A. Dean, Georges R. Harik and Paul Bucheit); or, more generally, based on content (See, e.g., U.S. patent application Ser. No. 10/375,900 (incorporated herein by reference), entitled "SERVING ADVERTISEMENTS BASED ON CONTENT", filed on Feb. 26, 2003 and listing Darrell Anderson, Paul Bucheit, Alex Carobus, Claire Cui, Jeffrey A. Dean, Georges R. Harik, Deepak Jindal, and Narayanan Shivakumar). Such advertising systems would like to present advertisements that are relevant to user requested information.

Although targeted advertising systems such as those introduced above represent a great advance in online advertising, to participate in online advertising, advertisers typically must perform many steps, some of which can be time consuming and expensive. For example, in the context of targeted online advertising, an advertiser must typically (1) select a desired action (typically having user's browser navigate to a particular destination Website or Web page (commonly referred to as a "landing page")) in response to a user selecting their ad, (2) select or target appropriate Web pages (or some other documents) to advertise on (i.e., target the serving of their ad) and (3) create ad copy (also referred to as a "creative") that will be used to entice users to select their ad.

Selecting a landing page is typically done manually or in a semi-automated fashion. In the manual case, an advertiser with a small or medium sized Website might have only a handful of Web pages related to the actual sale of products. In this case, the advertiser may manually specify appropriate ones of such Web pages. In the semi-automated case, an advertiser may have a medium to large Website which may include "landing pages" that were generated using a database. Typically one such Web page is generated for each product sold. Even in this semi-automated case, the generation of "landing pages" requires a large amount of work on behalf of the advertiser.

Selecting or targeting documents to advertise on can also be a difficult and laborious process. For example, an advertiser may select Web pages that one of its advertisements is to be shown on (these documents are called "content documents") manually. Thus, for example, an advertiser might decide to advertise on the Web page yahoo.com (Yahoo's home page). Given the number of content documents available, such manual selection often misses many opportunities, often including the most appropriate content documents for serving its ads with. As another example, an advertiser may choose a set of keywords which define a set of search engine "search results pages" on which one of its advertisements might be applicable (these documents are referred to as "search results documents"). Typically, the set of chosen keywords defines a set of words which have to occur in a query on a search engine for the ad to even be eligible for inclusion on the search results page.

Selecting a creative to communicate the purchasing opportunity to a customer can also be time consuming and expensive. For example, copy writers or advertising agents are often employed to come up with catchy creatives. However, hiring and managing copy writers and advertising agents is typically very expensive, and is therefore beyond the means of many small to medium size companies.

In view of the foregoing, it would be useful to help an advertiser to (1) select a desired action (typically having user's browser navigate to a particular Website or Web page (commonly referred to as a "landing page")) in response to a user selecting their ad, (2) select or target one or more appropriate Web pages (or "documents") to advertise on, and/or (3) create ad copy (also referred to as a "creative") that will be used to entice users to select their ad.

§2. SUMMARY OF THE INVENTION

The present invention helps advertisers to (1) select a landing page (or some other desired action in response to an ad selection by a user), (2) select or target appropriate Web pages (or "documents") to advertise on, and/or (3) create an ad creative that will be used to entice users to select their ad. The present invention may do so by using online information (such as advertiser Web pages in conjunction with products lists (which may have been derived from online information, but may be provided from an offline source), Web content, existing online ads, etc.). The present invention may also do so by using information from an electronic version of offline advertisement information.

§3. BRIEF DESCRIPTION OF THE DRAWINGS

§4. DETAILED DESCRIPTION

The present invention may involve novel methods, apparatus, message formats, and/or data structures for generating or helping to generate advertisement information. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventors regard their invention as any patentable subject matter described.

In the following, environments in which, or with which, the present invention may operate are described in §4.1. Then, exemplary embodiments of the present invention are described in §4.2. Examples of operations are provided in §4.3. Finally, some conclusions regarding the present invention are set forth in §4.4.

§4.1 ENVIRONMENTS IN WHICH, OR WITH WHICH, THE PRESENT INVENTION MAY OPERATE

§4.1.1 Exemplary Advertising Environment

Figure 1:
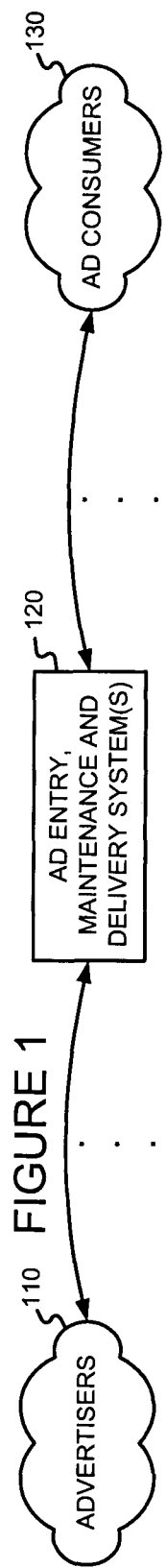
FIG. 1 is a high-level diagram showing parties or entities that can interact with an advertising system.

FIG. 1 is a high level diagram of an advertising environment. The environment may include an ad entry, maintenance and delivery system (simply referred to as an ad server) 120. Advertisers 110 may directly, or indirectly, enter, maintain, and track ad information in the system 120. The ads may be in the form of graphical ads such as so-called banner ads, text only ads, image ads, audio ads, video ads, ads combining one of more of any of such components, etc. The ads may also include embedded information, such as a link, and/or machine executable instructions. Ad consumers 130 may submit requests for ads to, accept ads responsive to their request from, and provide usage information to, the system 120. An entity other than an ad consumer 130 may initiate a request for ads. Although not shown, other entities may provide usage information (e.g., whether or not a conversion or click-through related to the ad occurred) to the system 120. This usage information may include measured or observed user behavior related to ads that have been served.

Figure 2:
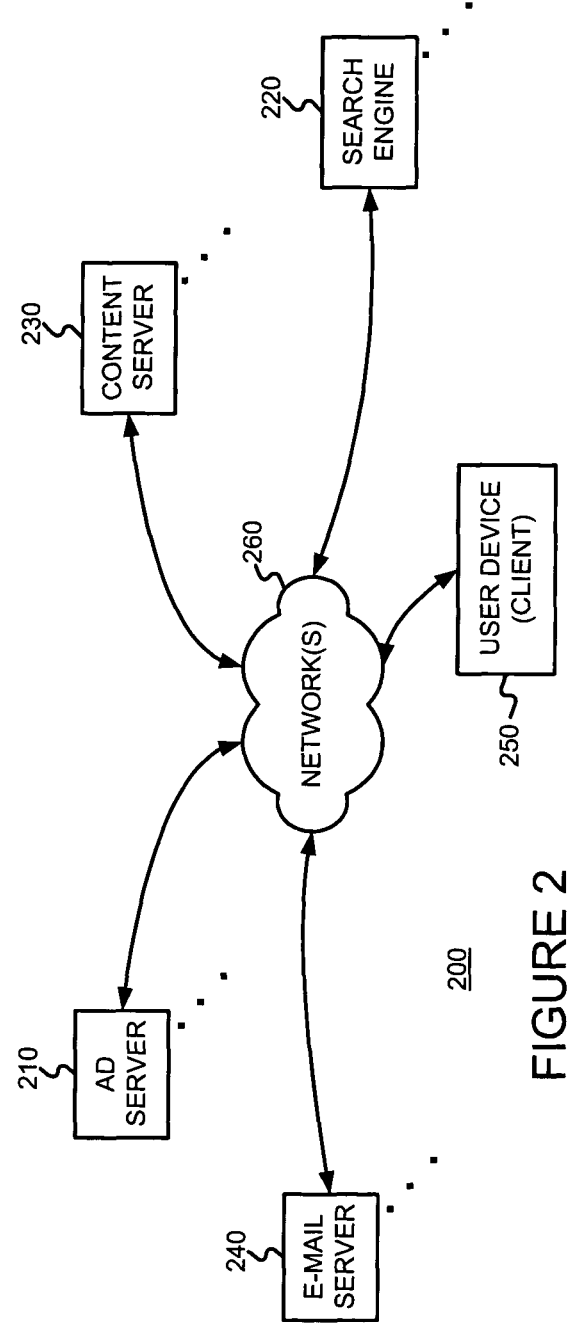
FIG. 2 illustrates an environment in which advertisers can target their ads on search results pages generated by a search engine, documents served by content servers, and/or e-mail.

The ad server 120 may be similar to the one described in FIG. 2 of U.S. patent application Ser. No. 10/375,900, (incorporated herein by reference), titled "SERVING ADVERTISEMENTS BASED ON CONTENT," filed on Feb. 26, 2003 and listing Darrell Anderson, Paul Bucheit, Alex Carobus, Claire Cui, Jeffrey Dean, Georges R. Harik, Deepak Jindal, and Narayanan Shivakumar as inventors. An advertising program may include information concerning accounts, campaigns, creatives, targeting, etc. The term "account" relates to information for a given advertiser (e.g., a unique e-mail address, a password, billing information, etc.). A "campaign" or "ad campaign" refers to one or more groups of one or more advertisements, and may include a start date, an end date, budget information, geo-targeting information, syndication information, etc. For example, Honda may have one advertising campaign for its automotive line, and a separate advertising campaign for its motorcycle line. The campaign for its automotive line may have one or more ad groups, each containing one or more ads. Each ad group may include targeting information (e.g., a set of keywords, a set of one or more topics, etc.), and price information (e.g., maximum cost (cost per click-though, cost per conversion, etc.)). Alternatively, or in addition, each ad group may include an average cost (e.g., average cost per click-through, average cost per conversion, etc.). Therefore, a single maximum cost and/or a single average cost may be associated with one or more keywords, and/or topics. As stated, each ad group may have one or more ads or "creatives" (That is, ad content that is ultimately rendered to an end user.). Each ad may also include a link to a URL (e.g., a landing Web page, such as the home page of an advertiser, or a Web page associated with a particular product or server). Naturally, the ad information may include more or less information, and may be organized in a number of different ways. Indeed, the present invention helps advertisers to avoid entering and/or managing much of the ad information.

FIG. 2 illustrates an environment 200 in which the present invention may be used. A user device (also referred to as a "client" or "client device") 250 may include a browser facility (such as the Explorer browser from Microsoft or the Navigator browser from AOL/Time Warner), an e-mail facility (e.g., Outlook from Microsoft), etc. A search engine 220 may permit user devices 250 to search collections of documents (e.g., Web pages). A content server 210 may permit user devices 250 to access documents. An e-mail server (e.g., Hotmail from Microsoft Network, Yahoo Mail, etc.) 240 may be used to provide e-mail functionality to user devices 250. An ad server 210 may be used to serve ads to user devices 250. The ads may be served in association with search results provided by the search engine 220, content provided by the content server 230, and/or e-mail supported by the e-mail server 240 and/or user device e-mail facilities.

Thus, one example of an ad consumer 130 is a general content server 230 that receives requests for documents (e.g., articles, discussion threads, music, video, graphics, search results, Web page listings, etc.), and retrieves the requested document in response to, or otherwise services, the request. The content server may submit a request for ads to the ad server 120/210. Such an ad request may include a number of ads desired. The ad request may also include document request information. This information may include the document itself (e.g., page), a category or topic corresponding to the content of the document or the document request (e.g., arts, business, computers, arts-movies, arts-music, etc.), part or all of the document request, content age, content type (e.g., text, graphics, video, audio, mixed media, etc.), geolocation information, document information, etc.

The content server 230 may combine the requested document with one or more of the advertisements provided by the ad server 120/210. This combined information including the document content and advertisement(s) is then forwarded towards the end user device 250 that requested the document, for presentation to the user. Finally, the content server 230 may transmit information about the ads and how, when, and/or where the ads are to be rendered (e.g., position, click-through or not, impression time, impression date, size, conversion or not, etc.) back to the ad server 120/210. Alternatively, or in addition, such information may be provided back to the ad server 120/210 by some other means.

Another example of an ad consumer 130 is the search engine 220. A search engine 220 may receive queries for search results. In response, the search engine may retrieve relevant search results (e.g., from an index of Web pages). An exemplary search engine is described in the article S. Brin and L. Page, "The Anatomy of a Large-Scale Hypertextual Search Engine," *Seventh International World Wide Web Conference*, Brisbane, Australia and in U.S. Pat. No. 6,285,999 (both incorporated herein by reference). Such search results may include, for example, lists of Web page titles, snippets of text extracted from those Web pages, and hypertext links to those Web pages, and may be grouped into a predetermined number of (e.g., ten) search results.

The search engine 220 may submit a request for ads to the ad server 120/210. The request may include a number of ads desired. This number may depend on the search results, the amount of screen or page space occupied by the search results, the size and shape of the ads, etc. In one embodiment, the number of desired ads will be from one to ten, and preferably from three to five. The request for ads may also include the query (as entered or parsed), information based on the query (such as geolocation information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., Web pages), full text of identified documents, topics of identified documents, feature vectors of identified documents, etc.

The search engine 220 may combine the search results with one or more of the advertisements provided by the ad server 120/210. This combined information including the search results and advertisement(s) is then forwarded towards the user that submitted the search, for presentation to the user. Preferably, the search results are maintained as distinct from the ads, so as not to confuse the user between paid advertisements and presumably neutral search results.

Finally, the search engine 220 may transmit information about the ad and when, where, and/or how the ad was to be rendered (e.g., position, click-through or not, impression time, impression date, size, conversion or not, etc.) back to the ad server 120/210. Alternatively, or in addition, such information may be provided back to the ad server 120/210 by some other means.

As discussed in U.S. patent application Ser. No. 10/375,900 (introduced above), ads targeted to documents served by content servers may also be served.

Finally, the e-mail server 240 may be thought of, generally, as a content server in which a document served is simply an e-mail. Further, e-mail applications (such as Microsoft Outlook for example) may be used to send and/or receive e-mail. Therefore, an e-mail server 240 or application may be thought of as an ad consumer 130. Thus, e-mails may be thought of as documents, and targeted ads may be served in association with such documents. For example, one or more ads may be served in, under, over, or otherwise in association with an e-mail.

Although the foregoing examples described servers as (i) requesting ads and (ii) combining them with content, one or both of these operations may be performed by a client device (such as an end user computer for example).

§4.1.2 Definitions

Online ads, such as those used in the exemplary systems described above with reference to FIGS. 1 and 2, or any other system, may have various intrinsic features. Such features may be specified by an application and/or an advertiser. These features are referred to as "ad features" below. For example, in the case of a text ad, ad features may include a title line, ad text, and an embedded link. In the case of an image ad, ad features may include images, executable code, and an embedded link. Depending on the type of online ad, ad features may include one or more of the following: text, a link, an audio file, a video file, an image file, executable code, embedded information, etc.

When an online ad is served, one or more parameters may be used to describe how, when, and/or where the ad was served. These parameters are referred to as "serving parameters" below. Serving parameters may include, for example, one or more of the following: features of (including information on) a page on which the ad was served, a search query or search results associated with the serving of the ad, a user characteristic (e.g., their geographic location, the language used by the user, the type of browser used, previous page views, previous behavior), a host or affiliate site (e.g., America Online, Google, Yahoo) that initiated the request, an absolute position of the ad on the page on which it was served, a position (spatial or temporal) of the ad relative to other ads served, an absolute size of the ad, a size of the ad relative to other ads, a color of the ad, a number of other ads served, types of other ads served, time of day served, time of week served, time of year served, etc. Naturally, there are other serving parameters that may be used in the context of the invention.

Although serving parameters may be extrinsic to ad features, they may be associated with an ad as serving conditions or constraints. When used as serving conditions or constraints, such serving parameters are referred to simply as "serving constraints" (or "targeting criteria"). For example, in some systems, an advertiser may be able to target the serving of its ad by specifying that it is only to be served on weekdays, no lower than a certain position, only to users in a certain location, etc. As another example, in some systems, an advertiser may specify that its ad is to be served only if a page or search query includes certain keywords or phrases, though, as alluded to above, the present invention obviates the need for an advertiser to enter targeting keywords. As yet another example, in some systems, an advertiser may specify that its ad is to be served only if a document being served includes certain topics or concepts, or falls under a particular cluster or clusters, or some other classification or classifications. As described below, the present invention may be used to help advertisers avoid entering targeting information or serving constraints.

"Ad information" may include any combination of ad features, ad serving constraints, information derivable from ad features or ad serving constraints (referred to as "ad derived information"), and/or information related to the ad (referred to as "ad related information"), as well as an extension of such information (e.g., information derived from ad related information).

A "document" is to be broadly interpreted to include any machine-readable and machine-storable work product. A document may be a file, a combination of files, one or more files with embedded links to other files, etc.; the files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.). Ad spots in the document may be defined by embedded information or instructions. In the context of the Internet, a common document is a Web page. Web pages often include content and may include embedded information (such as meta information, hyperlinks, etc.) and/or embedded instructions (such as Javascript, etc.). In many cases, a document has a unique, addressable, storage location and can therefore be uniquely identified by this addressable location. A universal resource locator (URL) is a unique address used to access information on the Internet.

"Document information" may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

Content from a document may be rendered on a "content rendering application or device". Examples of content rendering applications include an Internet browser (e.g., Explorer or Netscape), a media player (e.g., an MP3 player, a Realnetworks streaming audio file player, etc.), a viewer (e.g., an Abobe Acrobat pdf reader), etc.

A "content owner" is a person or entity that has some property right in the content of a document. (Documents are sometimes referred to as "properties.") A content owner may be an author of the content. In addition, or alternatively, a content owner may have rights to reproduce the content, rights to prepare derivative works of the content, rights to display or perform the content publicly, and/or other proscribed rights in the content. Although a content server might be a content owner in the content of the documents it serves, this is not necessary.

"User information" may include user behavior information and/or user profile information.

"E-mail information" may include any information included in an e-mail (also referred to as "internal e-mail information"), information derivable from information included in the e-mail and/or information related to the e-mail, as well as extensions of such information (e.g., information derived from related information). An example of information derived from e-mail information is information extracted or otherwise derived from search results returned in response to a search query composed of terms extracted from an e-mail subject line. Examples of information related to e-mail information include e-mail information about one or more other e-mails sent by the same sender of a given e-mail, or user information about an e-mail recipient. Information derived from or related to e-mail information may be referred to as "external e-mail information."

Various exemplary embodiments of the present invention are now described in §4.2.

§4.2 EXEMPLARY EMBODIMENTS

Figure 3:
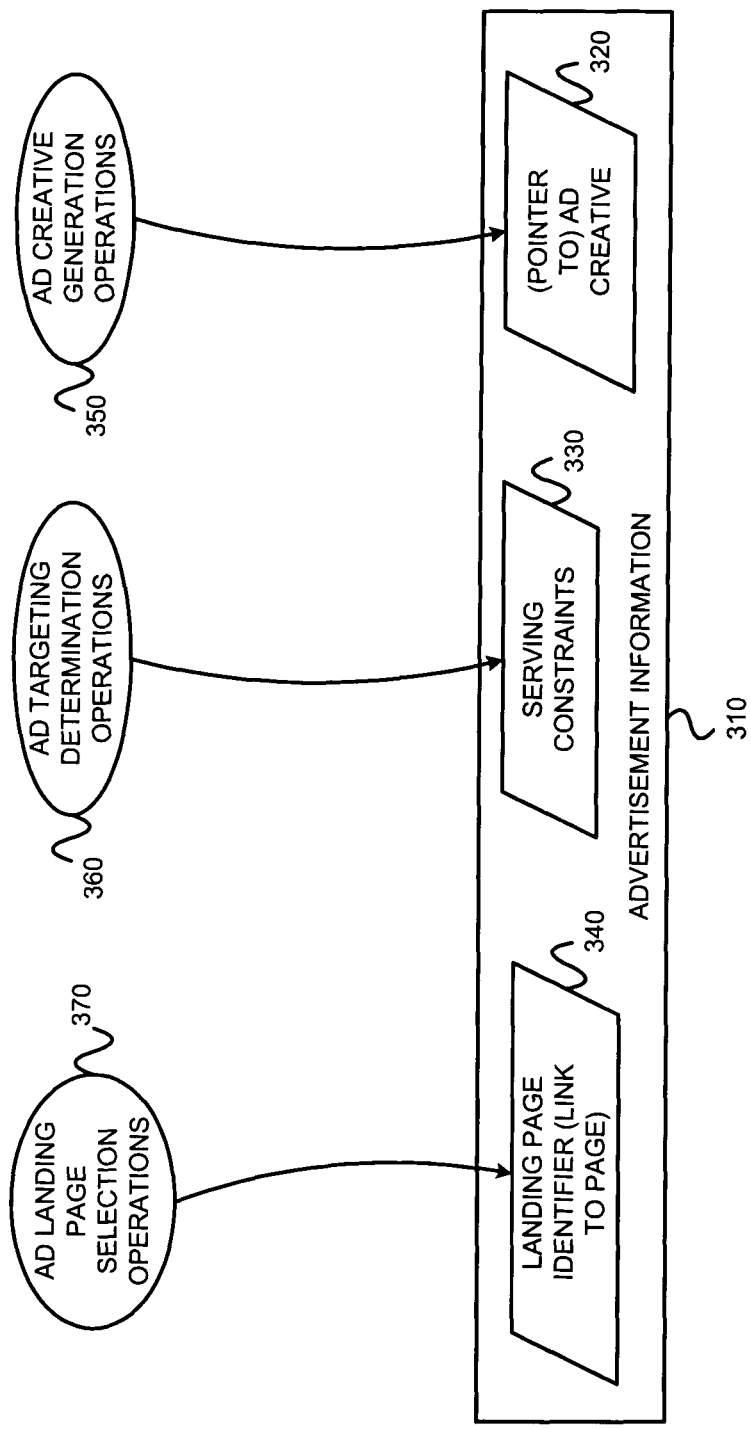
FIG. 3 is a bubble-diagram illustrating operations that may be used to generate advertisement information in a manner consistent with the present invention.

As shown in the general embodiment 300 of FIG. 3, advertisement information 310 may include an ad creative 320 (or a pointer to such an ad creative), serving constraints (or targeting information) 330, and a landing page identifier (e.g., a link to a Web page) 340. Although not shown in FIG. 3, advertisement information may include other information such as performance parameters of the ad, budget information, billing information, price information, advertiser information, etc.

Figure 4A:
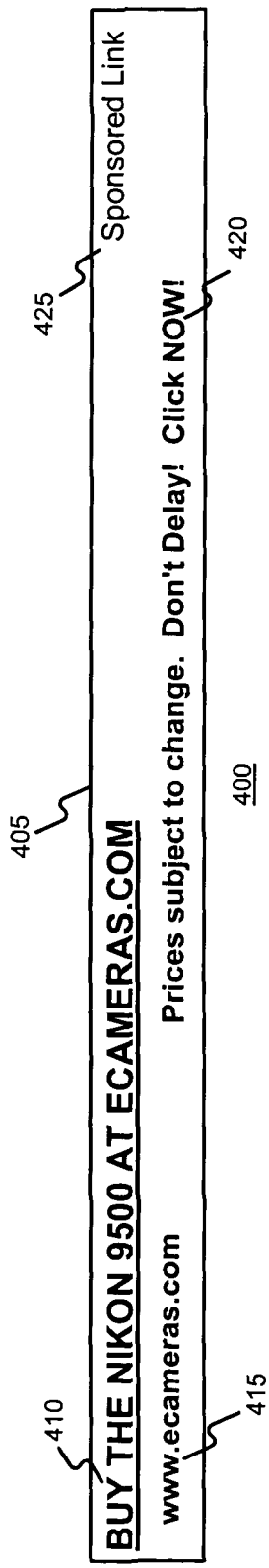
FIGS. 4A and 4B illustrate exemplary ad creatives that may be used with the present invention.
Figure 4B:
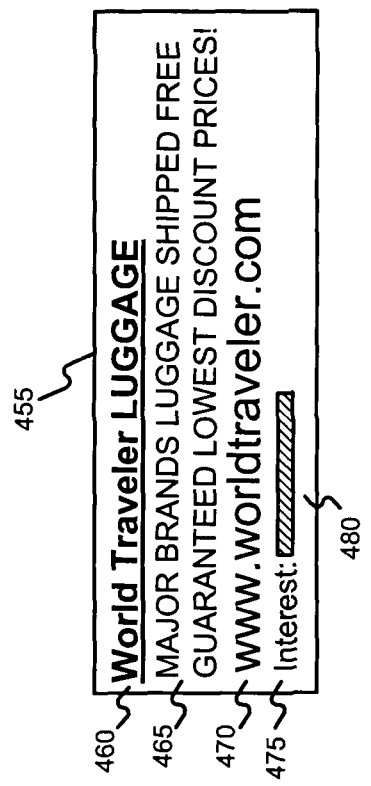

FIGS. 4A and 4B illustrate exemplary text ads 400 and 450, respectively. As shown in FIG. 4A, ad 400 may include a border 405, title text 410, a link to a landing page 415, ad copy 420, and an indication 425 that the ad is a sponsored link (e.g., to differentiate it from search results). As shown in FIG. 4B, ad 450 may include a border 455, title text 460, one or more lines of ad copy text 465, a link to a landing page 470, an interest text 475 and an interest level indicator 480.

Referring back to FIG. 3, consistent with the present invention, ad creative generation operations 350 may be used to generate ad creative information 320, ad targeting determination operations 360 may be used to generate serving constraints 330, and/or ad landing page selection operations 370 may be used to generate landing page information (e.g., a link to a landing page) 340. Thus, the present invention may generate online advertisements from Internet data by automatically determining all of the three above components for an advertiser. In one embodiment of the present invention, this is done by analyzing the advertiser's Website and possibly other related Websites. Initially, an advertiser's Web pages and possibly those of related Websites are downloaded. (The related Websites may be determined in any number of ways, such as by determining a complementary or competitive advertiser/provider, by analyzing the pages to determine topics or concepts, by reference to existing directories and catalogs, by analyzing links to or from the Websites, by examining results of queries issued to a search engine, etc., and/or many other techniques known in the art.) FIGS. 5-9 illustrate various embodiments for determining ad information. Note that various embodiments of the present invention may perform only one, only two, or all three of the operations just introduced.

Figure 5:
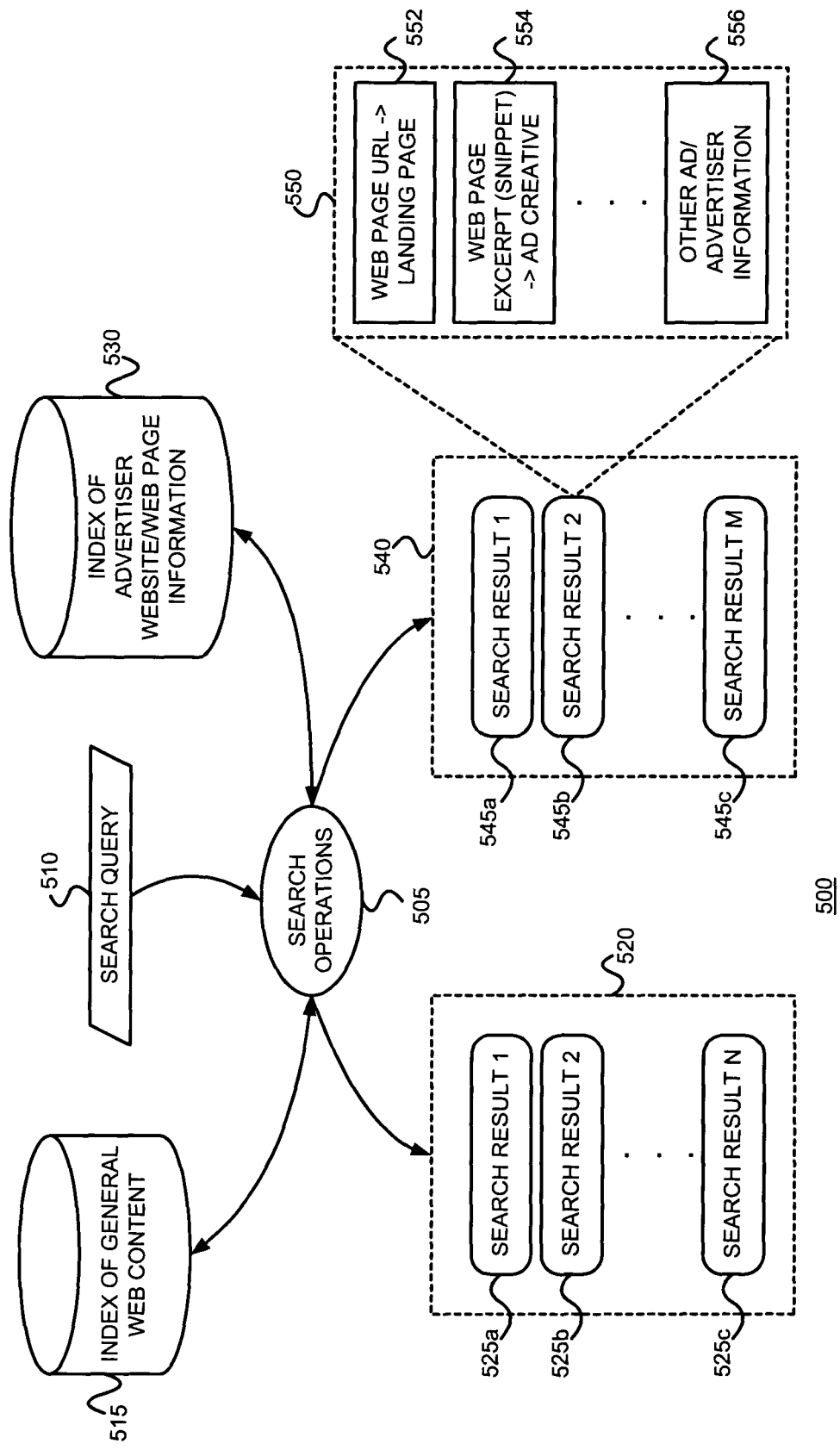
FIG. 5 is a bubble diagram of a first embodiment of the present invention.

FIG. 5 illustrates a first embodiment 500 of the present invention. When generating a search result document (e.g., a search result Web page), search operations 505 use a search query 510 to generate a set 520 of one or more search results 525 from an index of general Web content 515. In addition, the search operations 505 may use the search query 510 to generate a second set 540 of one or more search results 545 from a restricted index 530 (which may be a subset or part of the index 515 or a separate index) of advertiser Websites and/or Web pages. As indicated by block 550, each of the search results 545 may include a Web page URL 552, a Web page excerpt (such as a "snippet" of text surrounding search terms, or some other summary from the search operations 505 that shows how the Web page is relevant to the search query) 554. Each search result 545 may include other information 556 concerning the ad or advertiser. Such other information may include, for example, one or more of budget information, price information, advertiser quality information, etc.) Such other information 556 may also be provided outside of the search result 545, but associated with the search result 545 in some way. As shown by 552, a Web page on the advertiser's Website that was found to be relevant to the search query 510 may be used as a landing page. As shown by 554, the excerpt from the Web page (e.g., a snippet) may be used as the ad "creative". Although not required, ads can be ranked or scored using a search score (e.g., IR and/or Page Rank), which may have been generated by the search operations 505 of the associated search result, and/or other ad or ad advertiser information 556.

As can be appreciated from the foregoing, using the first embodiment 500 of the present invention, a search engine may be converted into a full advertising engine for each advertiser. Note also that although the advertiser can specify serving constraints, such serving constraints are not necessary since the search of the advertisers Website/Web pages 530 will presumably return relevant Web pages from which presumably relevant ads will be generated. The advertiser does not need to specify a landing page or a creative.

Figure 6:
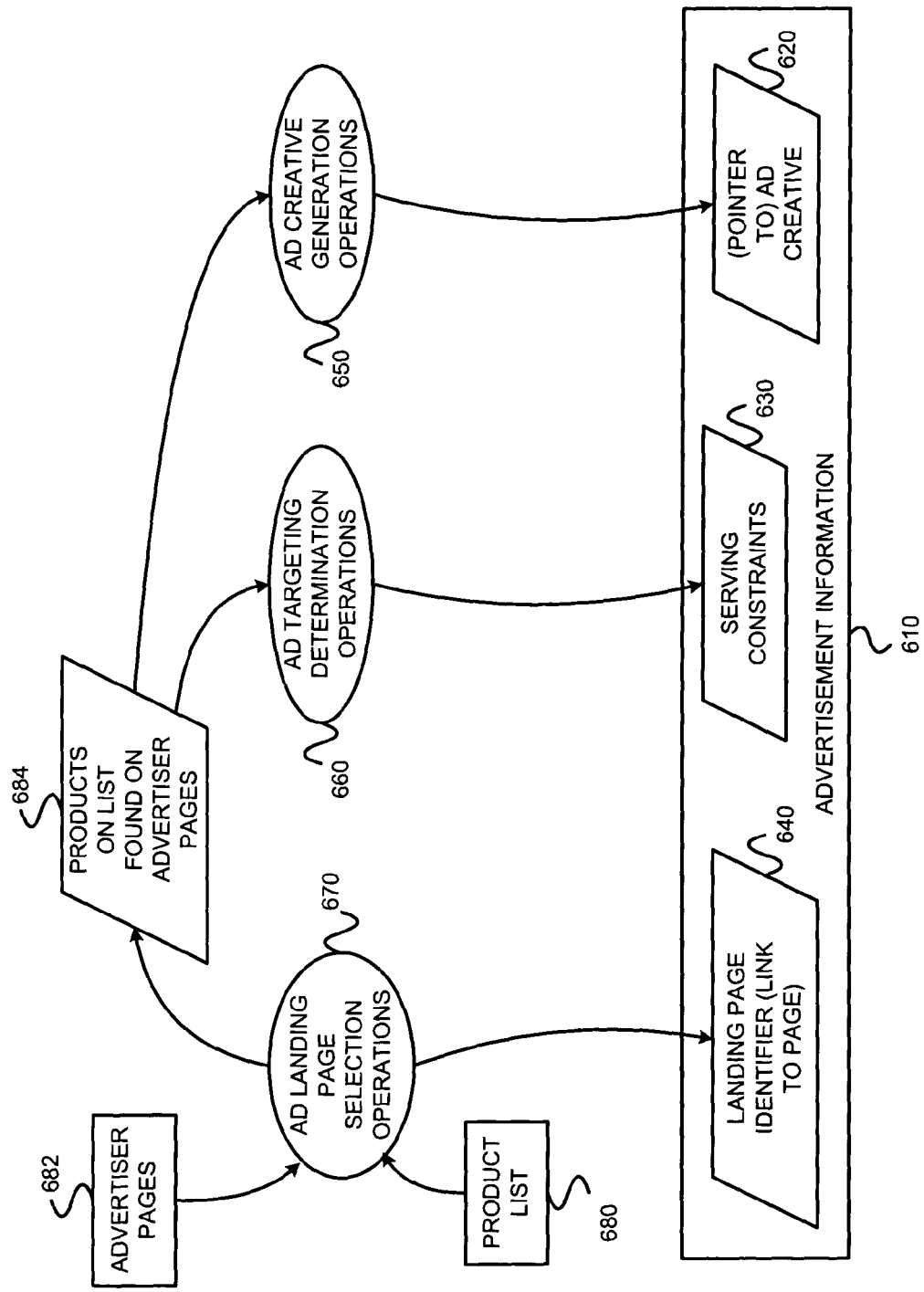
FIG. 6 is a bubble diagram of a second embodiment of the present invention.

FIG. 6 illustrates a second embodiment 600 of the present invention. A list 680 of products is used. This list may be (or may have been) compiled from a set of merchants (merchants may be, but are not necessarily, advertisers). Web pages 682 of an advertiser's Website are then scanned for each of the products. Any Web page that has a viable product on it (e.g., a product which matches one on the product list 680) is considered to be a viable "landing page." Ad landing page selection operations 670 may be used to select a landing page 640 from the viable landing pages. For example, the ad landing page selection operations 670 may select the landing page with the most products matching those on the product list 680. Furthermore, products on the list found on the advertiser's Web pages are stored 684. Ad targeting determination operations 660 may be used to determine a set of one or more serving constraints 630 used to determine documents that the advertisement would be relevant to. Thus, serving constraints 630 may be used to define relevant ads in the same way that keywords are used to define relevant search pages. For example, it would be alright to advertise product "nikon 9500" on a search results page for the query "nikon 9500 purchase". Finally, ad creative generation operations 650 may be used to create an ad "creative" 620. It may do so, for example, by adding a common phrase to all products such as "Buy <PRODUCT> at <MERCHANT>" and "Prices subject to change. Don't delay, click NOW!" (See, e.g., FIG. 4A.). The phrase may be determined using information of the landing page 640. For example, a landing page with dollar signs on it might trigger the buy phrase above. Another page with the word "review" on it might trigger a phrase template "See Reviews for <PRODUCT> at <MERCHANT>," and so on.

As can be appreciated from the foregoing, the embodiment illustrated in FIG. 6 can be used to generate all three of (i) a landing page 640, (ii) serving constraints 630, and (iii) an ad creative 620. Naturally, the embodiment may be used to generate only one or two of these three pieces of information.

Note that the embodiment of FIG. 6 may be used to generate advertisement information 610 for each of multiple ads. For example, a separate ad may be determined for each of the products stored 684, each with its own landing page 640, serving constraints 630 and ad creative 620. In another alternative, separate advertisement information 610 may be generated for each Web page on the advertiser's Website that has any (or at least a predetermined number of) products found on the product list 680.

Although the embodiment 600 of FIG. 6 was described with respect to products and a product list, such an embodiment can be applied to other things such as services. Thus, the list 680 may include products, services, and/or other things.

Figure 7:
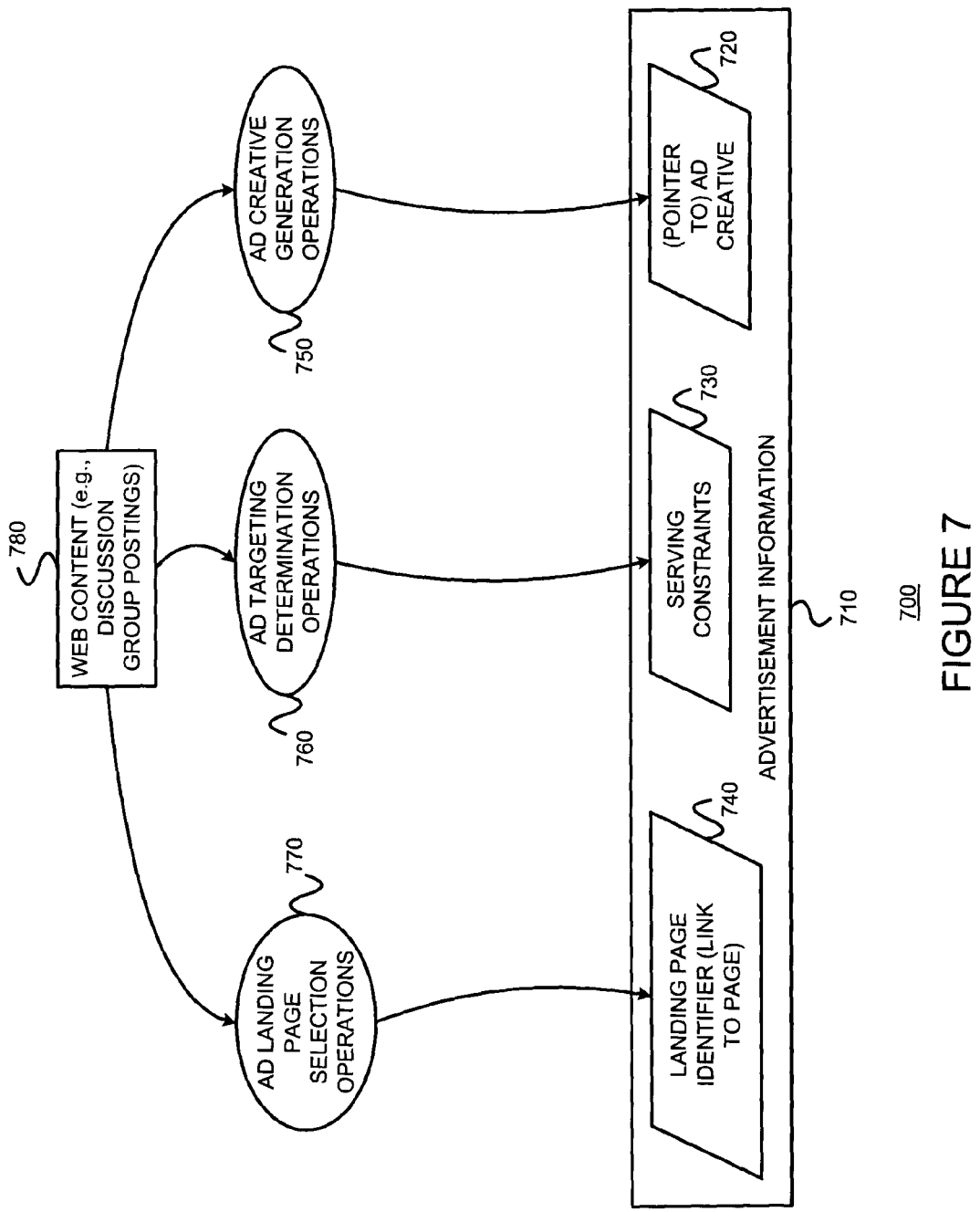
FIG. 7 is a bubble diagram of a third embodiment of the present invention.

FIG. 7 illustrates a third embodiment 700 of the present invention. In this embodiment, Web content 780, such as discussion groups for example, can be scanned for identifying ads that can be targeted to other Websites. For example, one discussion group may contain text such as the following: "I bought tennis balls at tennis.com, they were great! You should buy tennis balls at tennis.com". Ad landing page selection operations 770 may use such an element to determine a landing page 740 page—in this example "www.tennis.com". Ad targeting determination operations may use this element to determine a set of words related to the Web page (such as "tennis balls"), and save such words as serving constraints 730. A content-relevant targeted ad serving system (See, e.g., U.S. patent application Ser. No. 10/375,900 (incorporated herein by reference), titled "SERVING ADVERTISEMENTS BASED ON CONTENT," filed on Feb. 26, 2003 and listing Darrell Anderson, Paul Bucheit, Alex Carobus, Claire Cui, Jeffrey Dean, Georges R. Harik, Deepak Jindal, and Narayanan Shivakumar as inventors.) may use such words as serving constraints to determine appropriate documents for the ad. Finally, ad creative generation operations 750 may use this element to generate a creative 730—such as "You should buy tennis balls at tennis.com."

As can be appreciated from the foregoing, the embodiment 700 illustrated in FIG. 7 can be used to generate all three of (i) a landing page 740, (ii) serving constraints 730, and (iii) an ad creative 720. Naturally, the embodiment may be used to generate only one or two of these three pieces of information.

The embodiment 700 illustrated in FIG. 7 use arbitrary web content in which a product or Website was discussed—it is not limited to discussion groups only.

Figure 8:
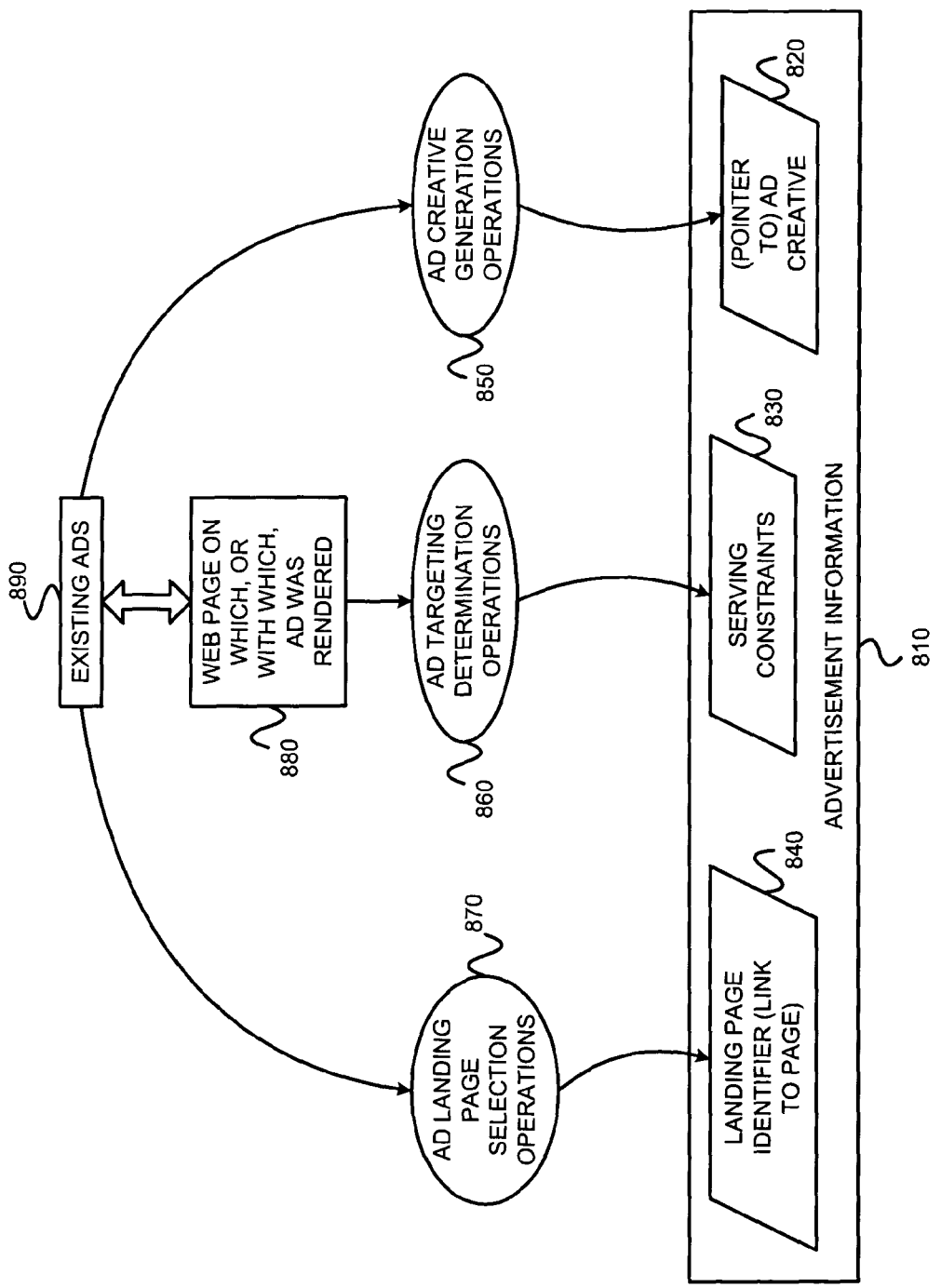
FIG. 8 is a bubble diagram of a fourth embodiment of the present invention.

FIG. 8 illustrates a fourth embodiment 800 of the present invention. In this embodiment, advertisements 890 that already exist on Web pages 880 are used. Such advertisements may be (or may have been) stored after a scan or crawl of the Web. Ad landing page selection operations 870 may use information in an existing ad 890 to determine a landing page 840. Such operations 870 may merely involve search (e.g., for a hypertext link), copy and paste operations. Ad creative generation operations 850 may use the existing ad 890 to generate a "creative" 820 as well. Such operations 850 may merely involve copying the ad. In one embodiment, proper ownership interests, if any, of content of the ad creative, is established. For example, the advertisers could be asked whether they own the rights for one or more ad creatives. Finally, ad targeting determination operations 860 may use information of one or more Web pages 880 on which an ad 890 is already shown on to determine serving constraints 830. These serving constraints can also be used, for example, by a content-relevant targeting ad serving system to determine one or more documents that the ad would be relevant to.

As can be appreciated from the foregoing, the fourth embodiment 800 illustrated in FIG. 8 may be used to simplify the process of migrating to a new ad serving system, ads that an advertiser may have already been using on other systems.

Figure 9:
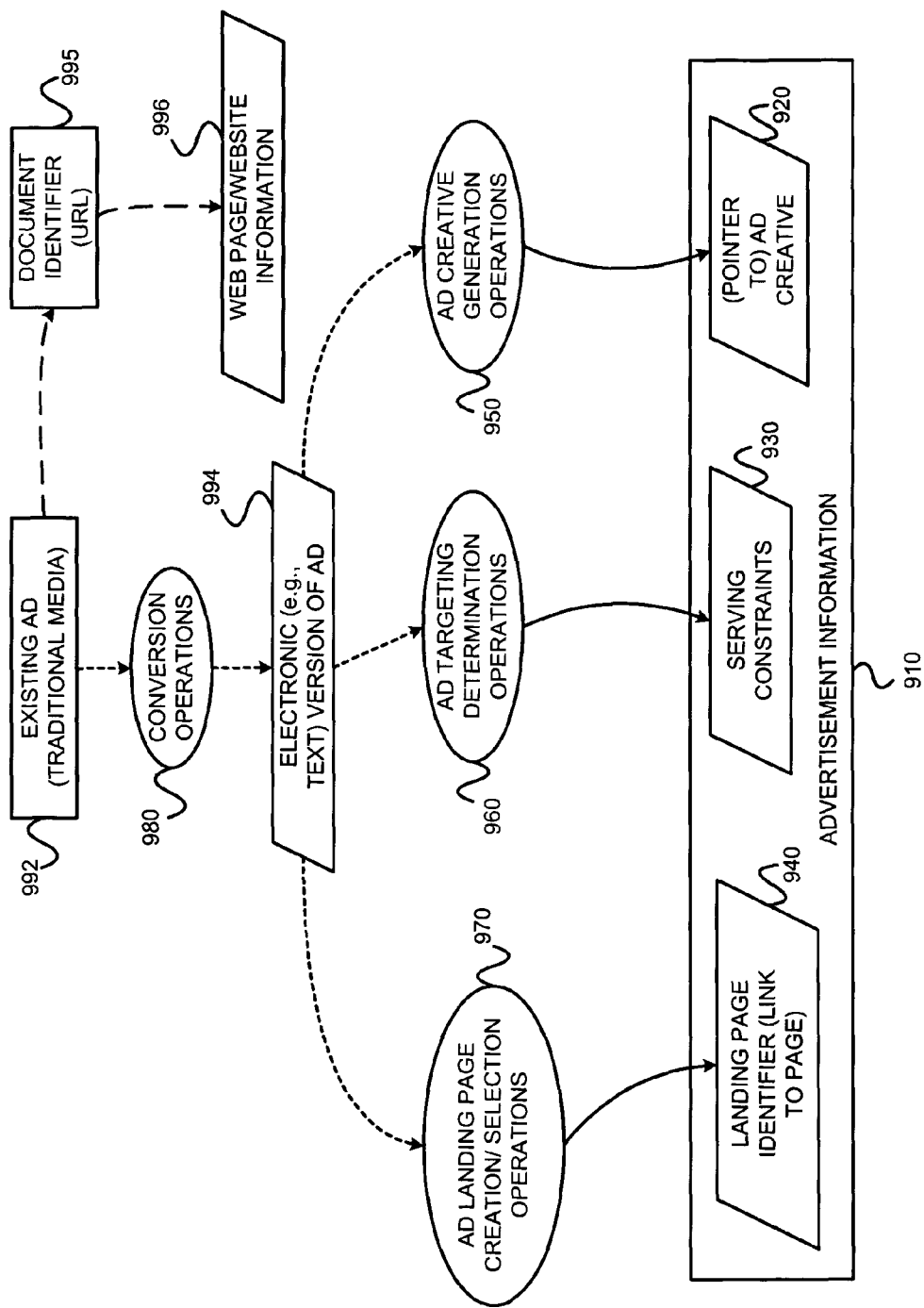
FIG. 9 is a bubble diagram of a fifth embodiment of the present invention.

In the embodiments described above with reference to FIGS. 5-8, the present invention used information available online. FIG. 9 illustrates an embodiment 900 of the invention that uses offline content. Offline content refers to content that is not typically reachable via the World Wide Web (referred to simply as "the Web"). Examples of offline content may include, but are not limited to:

listings or advertisements in yellow pages;
listings or advertisements in magazines and newspapers;
advertisements on bulletin boards in public areas;
advertisements on billboards;
television or radio advertisements;
advertisements on flyers left on the windshields of cars;
advertisements in coupon books;
promotional statements made by company representatives in public areas; and
advertisements on subway walls, or in trains or busses.

Naturally, other types of offline content may be used in a manner consistent with the present invention.

The following describes exemplary embodiments for generating ads from offline content. The embodiments may fall under two basic approaches. In a first approach, assuming one exists, a URL 995 is identified within the advertisement 992. The URL can be used to locate and obtain Web page (and/or Website) information 996. This information 996 (which is online information) can then be used to determine various ad information 910. (Recall, e.g., the use of information 682 in FIG. 6.) In a second approach, conversion operations 980 are used to generate an electronic version 994 of the offline advertisement 992. As described below, the electronic version 994 of the offline advertisement 992 may then be used to generate ad information 910. The electronic version of the ad 994 can range from simply a textual version of the offline content (for example, ads in the yellow pages can be scanned and perhaps processed using optical character recognition ("OCR")), to richer-content (e.g. html) version where the images are included, to an all-image format (e.g., gifs, jpegs), to an audio and/or video (e.g., MPEG) format. Note that although some advertisements may be in electronic form (such as NTSC or some other (broadcast) video signal, an (broadcast) audio signal, etc.), they may nonetheless be considered offline since they are not commonly available on the Web. Text may be derived from audio of an offline ad using various speech recognition techniques.

Ad landing page creation/selection operations 970 may determine a landing page 940 in various ways, two of which are described below. In the first approach discussed above, if a URL is identified within the advertisement, that URL may be used as the "landing page" 940. In the second approach discussed above, the electronic version 994 of the offline ad 992 (or at least some parts thereof) can be hosted as a Web page. This hosted Web page can be defined as the landing page 940. As can be appreciated from the foregoing, with this second method, the advertiser does not need to author, nor does it need to maintain, its own Web page or Website.

Ad targeting determination operations 960 may be used to generate serving constraints 930 using text recognized (e.g., using OCR) from the electronic version of the ad. Such text can be used to determine keywords for keyword targeting and/or relevance information (e.g., a topic, a concept, a classification, etc.) for content-relevant targeting. Thus, a textual electronic version of the offline content may be used to help determine a document to advertise on because the text, as well as document-relevance information, can be used by a content-relevance ad serving system to determine general Web pages on which the advertisement would be relevant. The textual electronic version of the offline content may also be used, together with search query terms, by a keyword ad serving system to determine search results pages on which the advertisement would be relevant.

Ad creative generation operations 950 may use content (e.g., text) of the electronic version 994 of the offline ad to create the ad "creative" 920. Since most advertising offline content contains a selling message such as "Cleann cleans your clothes better than the leading brand," the ad creative generation operations 950 may copy and/or manipulate such a selling message into a format suitable for the creative 920 of an online advertisement 910.

As was the case with the use of existing online ads 890 by the embodiment of FIG. 8, generating an ad creative 920 from offline content may raise copyright issues. One of either two cases will normally occur—the content is owned either by the company wishing to advertise online (the beneficiary), or by a third party. If the content is owned by the beneficiary, it is reasonable to believe that the beneficiary (the advertiser) would allow use of their original content in this new manner. The present invention may include means for verifying ownership of the content and/or for gaining permission to use it from the advertiser (if such permission is not implied). If the content is owned by a third party, it may be necessary to reach an agreement, with the third party owner, that would allow use of this content in the generation of advertisements. In any of the foregoing embodiments, the advertisement information 510, 610, 710, 810, 910 may include an indication of (a) whether there is an issue or potential issue of copyright in the ad creative, and/or (b) if there is such an issue or potential issue, whether an agreement has been reached. The values of these fields may affect when and/or where the ads are rendered.

Any inventions described in the foregoing may be used in concert with teachings provided in U.S. patent application Ser. No. 10/614,736 (incorporated by reference), titled "SERVING ADVERTISEMENTS USING A SEARCH OF ADVERTISER WEB INFORMATION", filed on Jun. 30, 2003 and listing Georges R. HARIK as the inventor.

Figure 10:
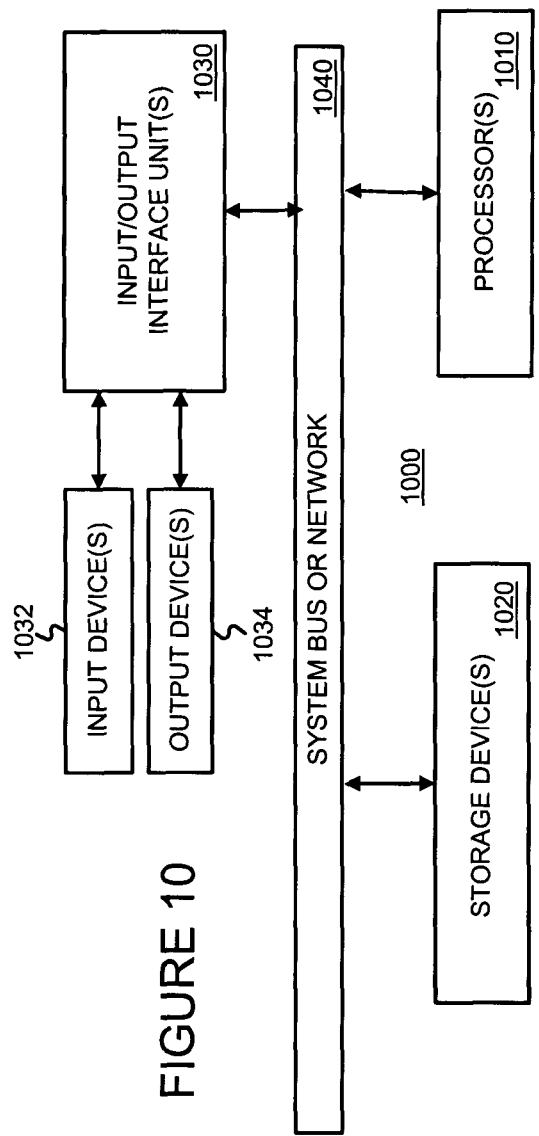
FIG. 10 is a block diagram of apparatus that may be used to perform at least some of the various operations that may be used and store at least some of the information that may be used and/or generated in a manner consistent with the present invention.

FIG. 10 is high-level block diagram of a machine 1000 that may be used to perform one or more of the operations discussed above. The machine 1000 basically includes one or more processors 1010, one or more input/output interface units 1030, one or more storage devices 1020, and one or more system buses and/or networks 1040 for facilitating the communication of information among the coupled elements. One or more input devices 1032 and one or more output devices 1034 may be coupled with the one or more input/output interfaces 1030.

The one or more processors 1010 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 1020 and/or may be received from an external source via one or more input interface units 1030.

In one embodiment, the machine 1000 may be one or more conventional personal computers. In this case, the processing units 1010 may be one or more microprocessors. The bus 1040 may include a system bus. The storage devices 1020 may include system memory, such as read only memory (ROM) and/or random access memory (RAM). The storage devices 1020 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 1032, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 1010 through an appropriate interface 1030 coupled to the system bus 1040. The output devices 1034 may include a monitor or other type of display device, which may also be connected to the system bus 1040 via an appropriate interface. In addition to (or instead of) the monitor, the personal computer may include other (peripheral) output devices (not shown), such as speakers and printers for example.

The ad server 210, user device (client) 250, search engine 220, content server 230, and/or e-mail server 240 may be implemented as one or more machines 1000.

§4.2.1 Alternatives

Although many of the above-described embodiments are able to automatically generate all of (i) landing page information, (ii) serving constraints, and (iii) an ad creative, such information can be supplemented, or replaced by manually entered (e.g., by the advertiser) information. For example, referring to FIG. 4B, an advertiser may have specified ad creative 460 and 465, but not the landing page 470, or targeting information (not shown). If one or more of (i) the landing page information, (ii) the serving constraint information, and (iii) the ad creative were manually entered, the present invention can skip the acts used to generate such information.

§4.3 CONCLUSIONS

As can be appreciated from the foregoing disclosure, the present invention can be used to help an advertiser easily start advertising using an online ad server, such as a keyword ad server or a content-relevant ad server for example, with little or no intervention required on the part of the advertiser.

What is claimed is:
1. A method for generating information for an online advertisement, the method comprising:
   a) generating a first plurality of search results using a search query and an index of advertiser Web page information;
   b) determining, for each of the first plurality of search results, at least one of (A) landing page information and (B) ad creative information using a corresponding one of the first plurality of search results;
   c) generating, for each of the first plurality of search results, an ad using the determined at least one of a landing page information and ad creative information; and d) generating a search result page including
  i) at least a second plurality of search results corresponding to the search query, and
  ii) the generated ads,
wherein the generated ads are maintained as distinct from the second plurality of search results on the search result page,
wherein the second plurality of search results is a predetermined number, and
wherein the predetermined number of the second plurality of search results is no less than a number of ads included on the generated search results page.

2. The method of claim 1 wherein the ad creative information is determined using information excerpted from an advertiser Web page.

3. The method of claim 1 wherein the ad creative information is determined using a text snippet of the search result.

4. The method of claim 1 wherein the ad creative information includes information excerpted from an advertiser Web page.

5. The method of claim 1 wherein the landing page information is a URL included in the search result.

6. The method of claim 1 wherein the first plurality of search results and the second plurality of search results are generated by the same search operations.

7. The method of claim 1 wherein the ads included on the generated search results page are ordered using a search score.

8. The method of claim 7 wherein the search score is a function of an information retrieval score.

9. The method of claim 7 wherein the search score is a function of a link analysis that assigns a numerical weighting to each element of a hyperlinked set of documents.

10. The method of claim 1 wherein the predetermined number of the second plurality of search results is independent of a number of ads included on the generated search result page.

11. The method of claim 1 wherein the predetermined number of the second plurality of search results is more than a number of the ads included on the generated search result page.

12. The method of claim 1 wherein ad creative information is determined, for each of the first plurality of search results, and wherein the determined ad creative information is used to generate the ad for each of the first plurality of search results.

13. The method of claim 12 wherein the ad creative information is determined using information automatically extracted from an advertiser Web page.

14. The method of claim 12 wherein the ad creative information is determined using a text snippet of the corresponding search result.

15. The method of claim 12 wherein the ad creative information includes information automatically extracted from an advertiser Web page.

16. Apparatus for generating information for an online advertisement, the apparatus comprising:
  one or more processors;
  at least one input device; and
  one or more storage devices storing processor-executable instructions which, when executed by one or more processors, perform a method of:
    a) generating a first plurality of search results using a search query and an index of advertiser Web page information;
    b) determining, for each of the first plurality of search results, at least one of (A) landing page information and (B) ad creative information using a corresponding one of the first plurality of search results;
    c) generating, for each of the first plurality of search results, an ad using the determined at least one of a landing page information and ad creative information; and
    d) generating a search result page including
      i) at least a second plurality of search results corresponding to the search query, and
      ii) the generated ads,
    wherein the generated ads are maintained as distinct from the second plurality of search results on the search result page,
    wherein the second plurality of search results is a predetermined number, and
    wherein the predetermined number of the second plurality of search results is no less than a number of ads included on the generated search results page.

17. The apparatus of claim 16 wherein the ad creative information is determined using information excerpted from an advertiser Web page.

18. The apparatus of claim 16 wherein the ad creative information is determined using a text snippet of the search result.

19. The apparatus of claim 16 wherein the ad creative information includes information excerpted from an advertiser Web page.

20. The apparatus of claim 16 wherein the landing page information is a URL included in the search result.

21. The apparatus of claim 16 wherein the first plurality of search results and the second plurality of search results are generated by the same search operations.

22. The apparatus of claim 16 wherein the ads included on the generated search results page are ordered using a search score.

23. The apparatus of claim 22 wherein the search score is a function of an information retrieval score.

24. The apparatus of claim 22 wherein the search score is a function of a link analysis that assigns a numerical weighting to each element of a hyperlinked set of documents.

25. The apparatus of claim 16 wherein the predetermined number of the second plurality of search results is independent of a number of ads included on the generated search result page.

26. The apparatus of claim 16 wherein the predetermined number of the second plurality of search results is more than a number of the ads included on the generated search result page.

27. The apparatus of claim 16 wherein ad creative information is determined, for each of the first plurality of search results, and wherein the determined ad creative information is used to generate the ad for each of the first plurality of search results.

28. The apparatus of claim 27 wherein the ad creative information is determined using information automatically extracted from an advertiser Web page.

29. The apparatus of claim 27 wherein the ad creative information is determined using a text snippet of the search result.

30. The apparatus of claim 27 wherein the ad creative information includes information automatically extracted from an advertiser Web page.

* * * * *